United States Patent [19]

Valentino

[11] Patent Number: 5,383,676
[45] Date of Patent: Jan. 24, 1995

[54] CENTERING APPARATUS FOR FRONT WHEEL OF THREE WHEELED VEHICLE

[76] Inventor: Thomas J. Valentino, 308 E. Pima, Phoenix, Ariz. 85004

[21] Appl. No.: 114,638

[22] Filed: Sep. 2, 1993

[51] Int. Cl.⁶ .............................................. B62K 21/10
[52] U.S. Cl. ..................................... 280/271; 280/282; 280/250; 280/279
[58] Field of Search ............ 280/271, 282, 270, 242.1, 280/249, 250, 279

[56] References Cited

U.S. PATENT DOCUMENTS

| | | | |
|---|---|---|---|
| 1,230,801 | 6/1917 | Schriver | 280/271 |
| 3,801,130 | 4/1974 | Belden | 280/271 |
| 4,108,460 | 8/1978 | Silva, Jr. | 280/271 |
| 4,129,317 | 12/1978 | Bell | 280/281.1 |
| 4,270,766 | 6/1981 | Thomas | 280/250 |
| 4,316,616 | 2/1982 | Boivin | 280/250 |
| 4,720,117 | 1/1988 | Hay | 280/250 |
| 5,022,671 | 6/1991 | Jones, Jr. | 280/271 |

FOREIGN PATENT DOCUMENTS

| | | | |
|---|---|---|---|
| 512578 | 7/1952 | Belgium | 280/279 |
| 458686 | 10/1913 | France | 280/250 |
| 32046 | 8/1927 | France | 280/271 |
| 667427 | 10/1929 | France | 280/250 |
| 851091 | 12/1939 | France | 280/250 |
| 914500 | 10/1946 | France | 280/271 |
| 261528 | 5/1949 | Germany | 280/279 |
| 2709561 | 9/1977 | Germany | 280/279 |
| 125852 | 5/1919 | United Kingdom | 280/250 |

*Primary Examiner*—Richard M. Camby
*Assistant Examiner*—Kevin Hurley
*Attorney, Agent, or Firm*—H. Gordon Shields

[57] ABSTRACT

Three wheel vehicle apparatus includes a pair of rear wheels and a front driving wheel. The front driving wheel is powered through a hand crank system, and the front, driving wheel is urged to a center, straight ahead position, by a tension spring connected between a main vehicle frame and elements of the front wheel.

12 Claims, 2 Drawing Sheets

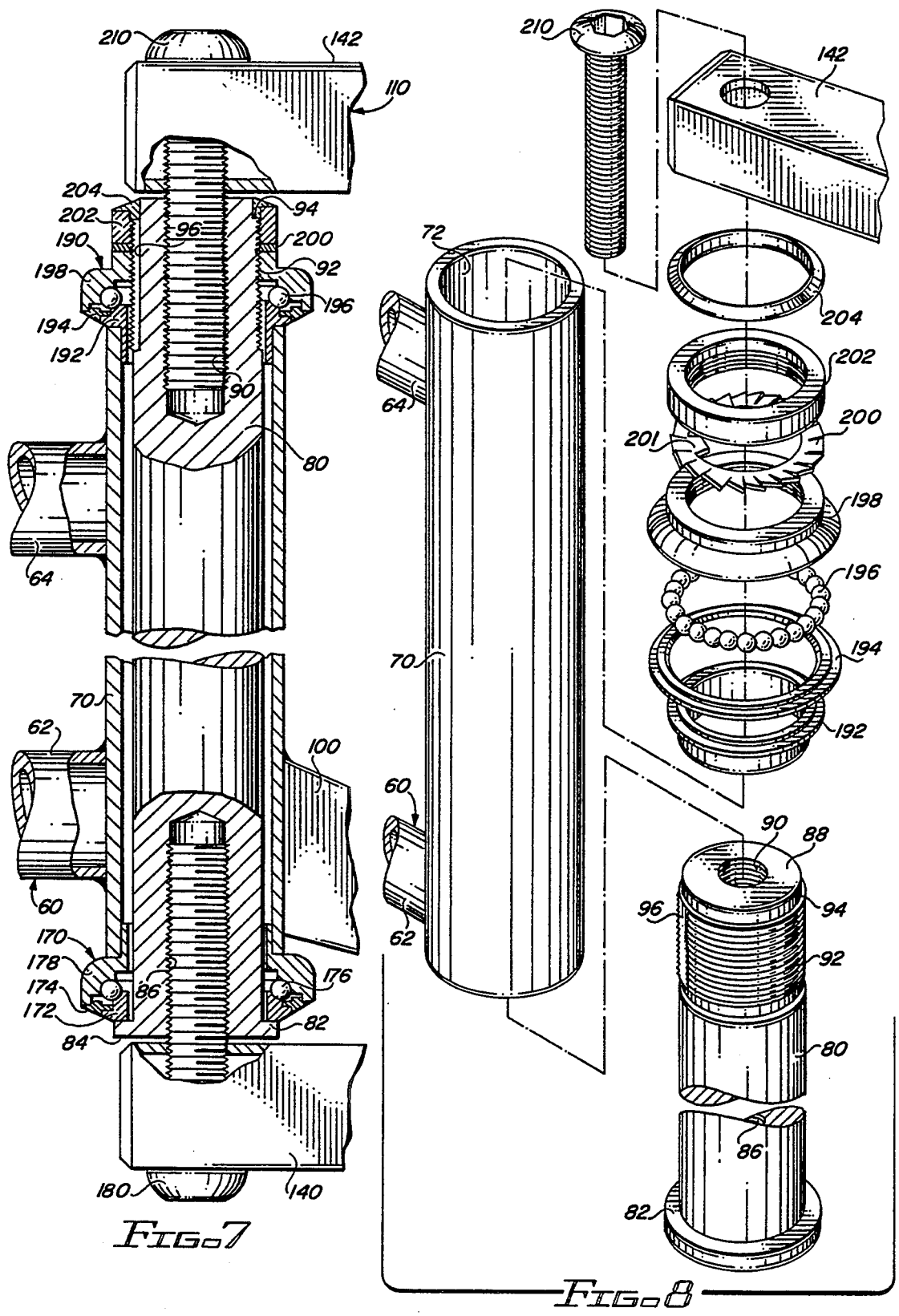

CENTERING APPARATUS FOR FRONT WHEEL OF THREE WHEELED VEHICLE

BACKGROUND OF THE INVENTION

1. Field of the Invention

This invention relates to three wheeled vehicles and, more particularly, to apparatus for centering the front wheel and in which the front wheel may be the driving wheel.

2. Description of the Prior Art

U.S. Pat. No. 90,687 (Rathmann & Johnson) discloses a bicycle with front wheel drive. The front wheel drive is hand cranked. The rear wheel is the steering wheel.

U.S. Pat. No. 92,689 (Atherton) discloses a hand cranked three wheeled vehicle with provisions for two passengers, the front passenger of which uses foot cranks connected to the front wheel, and the second, rear, passenger uses hand cranks connected to the rear wheel. Steering is through the front wheel.

U.S. Pat. No. 201,179 (Higley) discloses a three wheeled vehicle with provisions for both foot crank and hand crank elements connected to the front wheel. The front wheel is both the driving wheel and the steering wheel.

U.S. Pat. No. 505,373 (Sanford) discloses a three wheeled vehicle with hand crank elements connected to the front wheel. The front wheel is used for both driving and steering.

U.S. Pat. No. 577,749 (Hayes and Dilley) discloses a conventional chain drive for a bicycle. The chain drive is connected through pedals to the rear wheel. A tension spring is connected between the frame and the front forks for centering the front wheel. The centering apparatus is an add-on feature that may be used for virtually any model of bicycle.

U.S. Pat. No. 606,525 (Dunning & Barrow) discloses a pair of springs which act as torsion springs on a front fork spindle of a bicycle for urging the front wheel to a centered, straight ahead, position.

U.S. Pat. No. 1,873,047 (Schimmel et al) discloses a three wheeled vehicle which utilizes a hand crank connected to the front wheel through a chain drive. The front wheel is used for both steering and driving.

U.S. Pat. No. 3,848,891 (Vittori) discloses a three wheeled vehicle in which a front wheel is driven by a hand crank system. The hand crank system is unique in that it may be either a strictly a chain drive system through a pair of chains or a rotating shaft through a gear system may be connected to a chain drive. In other words, there are two drive elements between the hand crank and the front wheel, rather than the single chain drive system in the hand crank patents discussed above in conjunction with front wheel drive apparatus. Similarly, there are two connections for the front wheel, a standard pair of forks which connect the front wheel to the frame of the vehicle, and a second pair of forks utilized in conjunction with the driving system for the front wheel.

U.S. Pat. No. 4,720,117 (Hay) discloses apparatus for converting a wheel chair into a three wheeled velocipede. A pair of parallel links connect a frame to the front wheel which is a driving wheel powered by hand cranks. The pair of links is pivotly secured to a frame which is in turn secured to the wheel chair.

U.S. Pat. No. 5,022,671 (Jones) discloses a three wheeled velocipede powered by a hand crank system and utilizing a chain drive. A pair of springs is used to help center the front wheel fork relative to the frame. The springs are tension springs secured to a bar which is in turn secured to the front forks and is generally perpendicular to the front forks.

Most of the above discussed patents are three wheeled vehicles, or relate to three wheeled vehicles. Also, most of the above discussed patents utilize hand crank mechanisms connected to a front drive wheel. A few of the patents disclose elements for helping to center the front wheel when the front wheel is the driving wheel. Typically, springs are used. In one case, a pair of springs is used, and in another case a single tension spring is used as an add-on feature.

The apparatus of the present invention utilizes a tension spring to help center the front wheel of a three wheeled vehicle in which the front wheel is the driving wheel, being driven through a hand crank system.

SUMMARY OF THE INVENTION

The invention described and claimed herein comprises a three wheeled vehicle in which the front wheel is the driving wheel and is driven through a hand crank system. The front wheel is attached to a fixed vehicle frame through a pair of parallel arms secured to the pivoting front wheel, a length secured to the vehicle frame extends between the two parallel arms, and a tension spring is secured to the link and to one of the parallel arms. The tension spring urges the front wheel to a centered position.

Among the objects of the present invention are the following:

To provide new and useful hand crank vehicle apparatus;

To provide new and useful three wheeled vehicle apparatus;

To provide new and useful vehicle apparatus having a front drive wheel;

To provide new and useful apparatus for centering the front wheel of a three wheeled vehicle; and To provide new and useful apparatus for centering the front driving wheel of a three wheeled vehicle.

BRIEF DESCRIPTION OF THE DRAWING

FIG. 7 is an enlarged view in partial section of a portion of the apparatus of the present invention.

FIG. 8 is an enlarged exploded perspective view of the apparatus of FIG. 7.

DESCRIPTION OF THE PREFERRED EMBODIMENT

Figure 1:
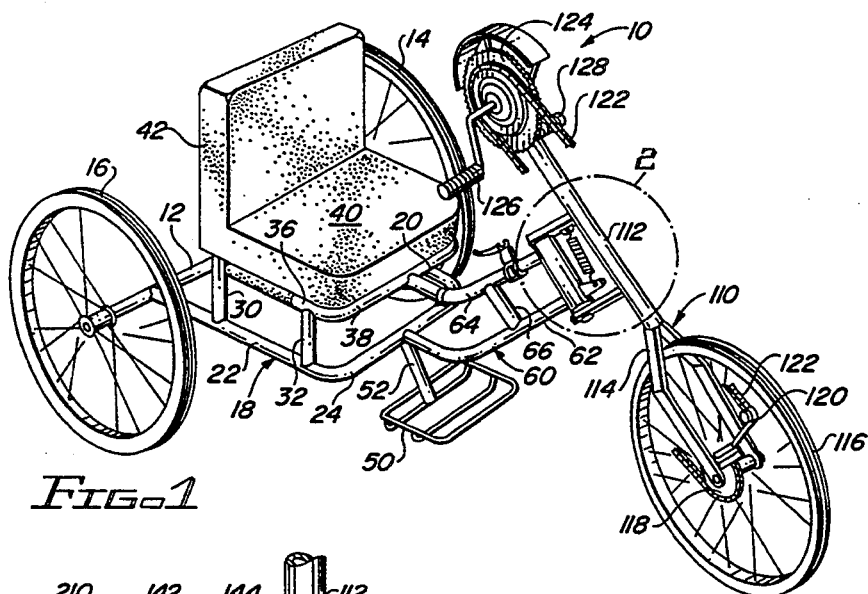
FIG. 1 is a perspective view of the apparatus of the present invention.

FIG. 1 is a perspective view of three-wheeled vehicle apparatus 10 of the present invention. The vehicle apparatus 10 comprises a hand cranked three wheeled or tricycle vehicle with the crank apparatus connected to the front wheel. The front wheel accordingly becomes the drive wheel for the apparatus 10.

The vehicle 10 includes a rear wheel and axle assembly 12 to which is secured a pair of wheels 14 and 16. A support frame 18 is appropriately secured to the wheel and axle assembly 12. The support frame includes a pair of generally longitudinally extending frame members 20 and 22 which are generally parallel to each other and which are secured to the axle assembly 12. The members 20 and 22 are secured together by a front cross member 24. The members 20, 22, and 24 comprise lower frame members.

Extending upwardly from the frame members 20 and 22 are vertical frame members, of which two frame members are shown extending upwardly from the frame member 22. The vertical frame members include vertical frame members 30 and 32. The vertical frame members are in turn secured to longitudinally extending frame members, of which a longitudinally extending frame member 36 is shown in FIG. 1. The upper longitudinal side members are connected by an upper front cross member 38.

A seat 40 is appropriately secured to the support frame 18, and specifically to the upper frame members. A seat back 42 is also appropriately secured to the support frame assembly 18.

A foot support 50 is connected to the lower front cross member 24 by a support member 52. The user of the apparatus 10 sits on the seat 40 and the foot support 50 receives the user's feet.

There is a front wheel support assembly 60, which extends outwardly from the support frame 18 to a front wheel assembly 110. The support assembly 60 includes a lower front wheel assembly support member 62 and an upper front wheel support assembly 64. An intermediary brace member or element 66 extends between the two elements 62 and 64.

Figures 2, 3, 4:
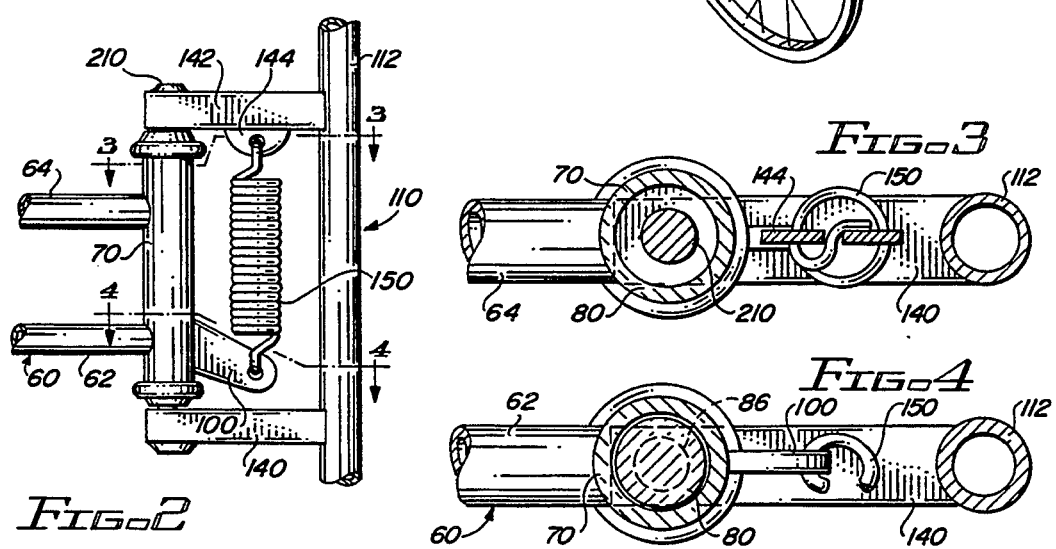
FIG. 2 is an enlarged view of a portion of the apparatus of FIG. 1 taken generally from circle 2 of FIG. 1.
FIG. 3 is a view in partial section taken generally along line 3—3 of FIG. 2.
FIG. 4 is a view in partial section taken generally along line 4—4 of FIG. 2.
Figures 5, 6:
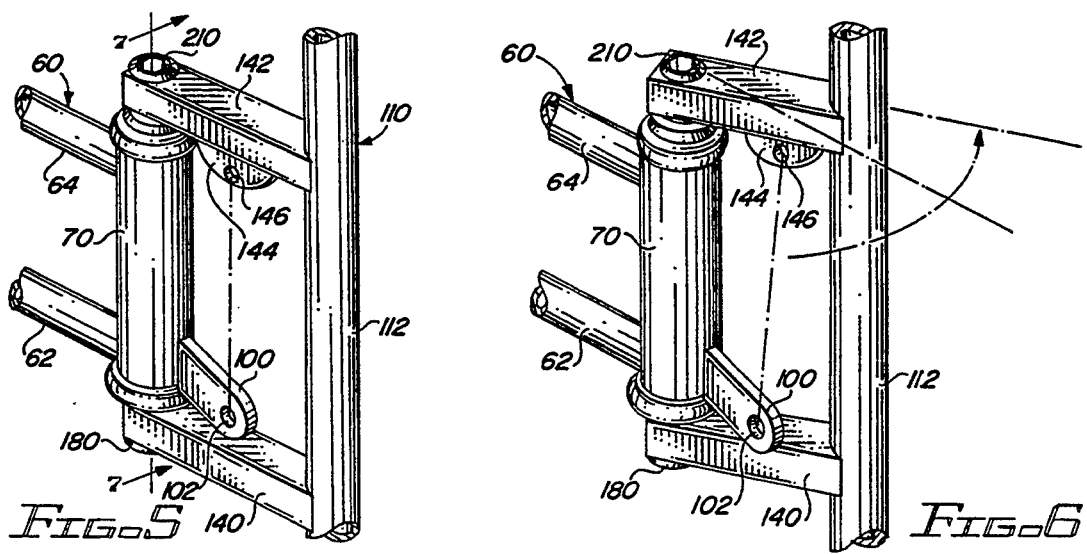
FIG. 5 is an enlarged perspective view of a portion the apparatus of the present invention.
FIG. 6 is an enlarged perspective view of the apparatus shown in FIG. 5 and illustrating the operation of the apparatus of the present invention.

As best shown in FIGS. 2, 5, and 6, the frame members 62 and 64 extend to a shaft housing 70. The shaft housing 70 is secured to the outer ends of the support members 62 and 64, remote from the support frame 18.

The front wheel assembly 110 includes a tube 112 and a pair of forks 114 extend downwardly from the bottom end of the tube 112. A front wheel 116 is appropriately secured to the forks 114. A sprocket assembly 118 is secured to the front wheel 116, and a bottom derailleur assembly 120 is in turn secured to the sprocket assembly 118.

A drive chain 120 extends between the lower sprocket assembly 118 and an upper sprocket assembly 124. The upper sprocket assembly 124, may also include an upper derailleur assembly.

A pair of cranks 126 and 128 is in turn secured to the upper sprocket 124. The cranks 126 and 128 are aligned parallel to each other. The user of the vehicle 10 grasps the cranks, or hand grips secured to the cranks 126 and 128, and by turning the cranks, the front wheel is driven through the chain 122 between the top or upper sprocket 128 and the bottom or lower sprocket 118.

Extending outwardly from the tube 112 are two brackets. The brackets are best shown in FIGS. 2, 3, 4, 5, and 6. FIGS. 2, 3, and 4, along with FIGS. 5 and 6, illustrate the operation of the front wheel centering elements which are included in the apparatus of the present invention. FIG. 2 comprises an enlarged side view taken generally from circle 2 of FIG. 1. FIG. 3 is a view in partial section through the upper part of the shaft housing 70 and the tube 112, taken generally along line 3—3 of FIG. 2. FIG. 4 is a view in partial section taken generally along line 4—4 of FIG. 2 through the lower portion of the shaft housing 70 an associated portion of the tube 12.

FIG. 5 is a perspective view of the apparatus shown in FIG. 2, and FIG. 6 is a perspective view of the elements shown in FIGS. 2 and 5 with the front wheel being turned to the left, and illustrating the centering elements. For the following discussion, reference will primarily be made to FIGS. 2, 3, 4, 5, and 6.

The shaft housing 70 is secured to the tube 112 through a pair of brackets 140 and 142. The bracket 140 is a bottom bracket which extends outwardly from the tube 112, and the bracket 142 is a top bracket which extends outwardly from the tube 112 generally parallel to the bottom bracket 140. The brackets 140 and 142 are spaced apart from each other an appropriate distance to receive the shaft housing 70.

Extending outwardly from the shaft housing 70 is a spring lever arm or post 100. A spring aperture 102 extends through the arm or post 100 adjacent to the outer or distal end of the post 100, and accordingly remote from the shaft housing 70. It will be noted, as best shown in FIG. 2, that the arm or post 100 extends downwardly from the shaft housing 70 to which it is appropriately secured, as by welding. It will also be noted that the appearance of the post or arm 100 appears distorted in FIGS. 5 and 6 due to the angle of the perspective views and the downward orientation of the post or arm 100.

Extending downwardly from the bottom of the top or upper bracket 142 is a top spring bracket or tab 144. The bracket or tab 144 includes a spring aperture 146 extending through it. A tension spring 150 extends between the post or bracket 100 and the bracket 144. The outer ends of the spring 150 extend through the respective apertures 102 and 146.

As may best be understood by reference to FIGS. 2, 5, and 6, as the front wheel assembly 110 is turned to the left, by the user of the apparatus 10 by applying a turning pressure to the cranks 126 and 128, the spring 150 will stretch or extend. This may be understood by reference particularly to FIGS. 5 and 6. The greater the turning arc of the front wheel assembly 110, the more the spring 150 will stretch, and accordingly the greater the tension that will be applied between the brackets 100 and 144 to return the brackets 100 and 144 to their aligned orientation, which is the centered position of the front wheel assembly 110 relative to the front wheel support assembly 60.

With the front wheel assembly 110 aligned with the front wheel support assembly 60, there is minimum tension on the spring 150. However, when the front wheel assembly 110 is moved away from the center position, the spring 150 exerts a bias on the front wheel assembly 110 through the bracket 144 and the bracket 142 to urge the front wheel assembly 110 back to an aligned position of minimum tension.

The securing of the front wheel assembly 110 to the front wheel support assembly 160 is best illustrated in FIGS. 7 and 8, when FIGS. 7 and 8 are taken in conjunction with FIGS. 1–6. FIG. 7 comprises a view in partial section through the shaft housing 70, showing the elements associated with the brackets 140 and 142. FIG. 8 is an exploded perspective view of most of the elements shown in FIG. 7. For the following discussion, reference will primarily be made to FIGS. 7 and 8.

The shaft housing 70 is a generally cylindrical element which is appropriately secured as by welding to the support members 62 and 64. The shaft housing 70 includes a generally cylindrical bore 72 which extends through the housing 70 for the full length of the housing.

A shaft 80 is disposed in the bore 72 and is appropriately secured to the brackets 140 and 142. The shaft 80 includes a generally radially outwardly extending flange 82, and the flange 82 includes a flat bottom surface 84. A tapped or threaded bore 86 extends into the shaft 80 from the bottom surface 84. The threaded bore 86 is generally coaxially aligned with the shaft 80.

The shaft 80 also includes a flat or planer top 88 which is generally parallel to the bottom 84. Extending inwardly from the flat top or surface 88 is an internally threaded bore 90. The bore 90 is similarly coaxially aligned with the shaft 80 and accordingly is also aligned with the threaded bore 86.

On the outer periphery of the upper portion of the shaft 80 is an externally threaded portion 92. A shoulder 94 is defined between the externally threaded portion 92 and an upper reduced diameter portion of the shaft 80. A slot or keyway 96 extends vertically through at least part of the threaded portion 92. The keyway 96 extends downwardly from the shoulder 94.

The shaft 80 is appropriately secured to the brackets 140 and 142 by a pair of screws 180 and 210. The screw 180 is a bottom screw and the screw 210 is a top screw. With the bracket 140, the shaft 80, and the bracket 142 secured together as an integral unit, the shaft 80 becomes a part of the front wheel assembly 110. The front wheel assembly 110 then rotates relative to the shaft housing 70 through the shaft 80.

The relative rotation of the shaft 80 and, essentially, the shaft housing 70, is accomplished through bearing assemblies illustrated in FIGS. 7 and 8. There is a lower bearing assembly 170 and an upper bearing assembly 190 which support the shaft 80 relative to the housing 70. The lower bearing assembly 170 includes a lower bearing race 172 which is disposed on the radially outwardly extending flange 82 of the shaft 80. An upper bearing race 178 includes a relatively short cylindrical portion in which extends inside the tube 70 and about the shaft 80. A plurality of ball bearings 176 is disposed between the races 172 and 178. The bearings 176 are preferably roller bearings. The outer peripheries of the races 172 and 178 are sealed by a seal element 174.

The upper bearing assembly 190 is shown exploded in FIG. 8. The bearing assembly 190 includes a lower or bottom race 192 spaced apart from an upper race 198 by a plurality of bearing elements 196. The bearing elements 196 are preferably roller bearings, as illustrated.

The outer peripheries of the races 192 and 198 are appropriately sealed by a seal 194.

A lock washer 200 is disposed on the top of the upper race 198, and a lock nut 202 is snugged against the lock washer 200 to hold the upper bearing assembly 190 in place. A top seal 204 is then placed over the lock nut 202 and the shoulder portion 94 of the shaft 80.

The lockwasher 200 includes an inwardly extending tab or key 201 which extends into the keyway or slot 96 in the shaft 80. The key 201 in the slot 96 prevents the washer 200 from turning with the locknut 202 as the locknut 202 is tightened to secure the shaft 80 and the lower bearing assembly 170 and the upper bearing assembly together. This helps to prevent an excessive force or load from being applied on the bearings.

With the lower bearing assembly 170 and the upper bearing assembly 190 in place, as shown in FIG. 7, the bottom screw 180 extends through a pair of aligned and tapped holes in the bracket 140 and into the lower threaded bore 86 of the shaft 80 to secure the bottom of the shaft 80 to the bracket 140.

The upper screw 210 is then used to secure the shaft 80 to the bracket 142. The screw 210, like the screw 180, extends through a pair of aligned holes or apertures in the bracket 142. The screw 210 then extends into the tapped bore 90.

It will be understood that the screws 180 and 210 will be used to secure the brackets 140 and 142, respectively, to the shaft 80 after the shaft 80 is assembled to and within the shaft housing 70. The lock nut 202 is used to secure the two bearing assemblies and the shaft 80 to the front wheel support assembly 60 through the shaft housing 70.

The lock nut 202, and the upper bearing race 198 are both appropriately tapped on their inner peripheries and accordingly threadedly engage the upper threaded portion 86 of the shaft 80. Thus, essentially the upper bearing race 198 acts as a lock nut to secure the lower bearing assembly 170 as well as the upper bearing assembly 190 to the shaft 80 and to the shaft housing 70. The lock nut 202, as well as the lock washer 200, are provided for extra protection to insure that the upper bearing race 198 does not come loose through vibration associated with the operation of the vehicle 10.

As best shown in FIG. 7, the outer peripheries of the bearing races are disposed outwardly beyond the outer periphery of the shaft housing 70, and accordingly the bearing races are disposed at opposite ends of the shaft housing 70 and are appropriately secured thereto through the shaft 80 and the threaded engagement between threaded portion 86 of the shaft 80 and the upper bearing race 198 and the lock washer 202.

It will be noted that the lower bearing assembly 170 is not shown in FIG. 8 due to space constraints. However, from FIG. 7 it will be noted that the lower bearing assembly is essentially the same, although inverted, of the corresponding elements of the upper bearing assembly 190. While the outer periphery of the upper race 198 is threaded to engage the shaft 80, the upper race 178 of the lower bearing assembly 170 extends into the bore 72 about the lower portion of the shaft 80.

While the principles of the invention have been made clear in illustrative embodiments, there will be immediately obvious to those skilled in the art many modifications of structure, arrangement, proportions, the elements, materials, and components used in the practice of the invention, and otherwise, which are particularly adapted to specific environments and operative requirements without departing from those principles. The appended claims are intended to cover and embrace any and all such modifications, within the limits only of the true spirit and scope of the invention.

What is claimed is:

1. Apparatus for centering the front wheel of a vehicle comprising in combination:
   vehicle frame means including
   a shaft housing, and
   a bore in the shaft housing;
   front wheel assembly means connected to the vehicle frame means, including
   a front wheel pivotable for steering the vehicle,
   front wheel frame means to which the front wheel is secured and pivotally connected to the vehicle frame means, including bracket means securable to the shaft;

a shaft in the shaft housing;

means for securing the shaft to the bracket means to secure the front wheel assembly to the vehicle frame means; and a spring secured to the shaft housing and to the bracket means for providing a bias to urge the front wheel assembly to a centered position relative to the vehicle frame means.

2. The apparatus of claim 1 in which the bracket means includes a first bracket disposed above the shaft housing and a second bracket disposed below the shaft housing.

3. The apparatus of claim 2 in which the spring extends between and is secured to the first bracket of the bracket means and the shaft housing.

4. The apparatus of claim 3 in which the vehicle frame means further includes a post extending outwardly from the shaft housing, and the spring is secured to the post.

5. The apparatus of claim 1 in which the vehicle frame means further includes bearing means for supporting the shaft relative to the shaft housing.

6. The apparatus of claim 1 in which the spring comprises a tension spring.

7. Vehicle apparatus comprising in combination:

vehicle frame means including a shaft housing, a bore in the shaft housing, at least a single frame member secured to and extending rearwardly from the shaft housing, and a post secured to and extending forwardly from the shaft housing;

front wheel assembly means, including a front wheel pivotable from a centered position for turning the vehicle, forks to which the front wheel is secured, a tube secured to the forks, a first bracket secured to the tube and disposed above the shaft housing, and a second bracket secured to the tube and spaced apart from the first bracket and disposed beneath the shaft housing;

shaft means disposed in the bore of the shaft housing;

means for securing the shaft means to the first and second brackets to secure together the vehicle frame means and the front wheel assembly; and tension spring means secured to and extending between the post on the shaft housing and the first bracket for providing a bias to urge the front wheel assembly to a centered position relative to the vehicle frame means.

8. The apparatus of claim 7 in which the shaft means includes a shaft in the bore of the shaft housing and bearing means for pivotally supporting the shaft in the shaft housing.

9. The apparatus of claim 7 in which the vehicle frame means further includes a rear wheel and axle assembly, including a pair of rear wheels and a seat for receiving a user of the vehicle apparatus.

10. The apparatus of claim 9 in which the front wheel assembly means further includes a first sprocket connected to the front wheel, a second sprocket connected to the tube, a pair of cranks secured to the second sprocket for rotating the second sprocket and for pivoting the front wheel to turn the vehicle, and a chain connecting the first and second sprockets for rotating the front wheel in response to rotation of the pair of cranks by the user of the vehicle.

11. The apparatus of claim 10 in which the pair of cranks are aligned generally parallel to each other.

12. The apparatus of claim 1 in which the front wheel frame means includes a sprocket secured to the front wheel, and the front wheel assembly means further includes an upper sprocket aligned with the sprocket secured to the front wheel and having a pair of aligned cranks secured to the upper sprocket, and a chain extending around both sprockets.

* * * * *